Patented Sept. 16, 1941

2,255,828

UNITED STATES PATENT OFFICE 2,255,828

MANUFACTURE OF CELLULOSIC ARTICLES

Antonie Sonneveld, New York, N. Y., assignor to Transtone Corporation, New York, N. Y., a corporation of New York No Drawing. Application December 2, 1940, Serial No. 368,229

3 Claims. (Cl. 106—177)

This invention relates to compositions of matter in which cellulose derivatives are mixed and combined with suitable solvents, with a compatible plasticizer, and with or without the addition of other useful agents, particularly, although not essentially, to obtain a film or coating having certain desirable properties.

In order to obtain a cellulosic film or coating which has universal use, it is desirable that the film be pliable, have high tensile strength, be exceedingly highly resistant to the absorption of moisture, have non-inflammable properties, and be both acid and alkaline resistant.

In order to obtain a product having some of the foregoing properties, cooking processes were necessary, and while some of these properties were attained through the medium of cold processes, no single process has been able to produce a film or coating having all of the enumerated properties. Heretofore, when high resistance to moisture absorption was desired, the film, whether produced cold or cooked, had to be subjected to a second processing step wherein paraffin baths, for instance, were employed to provide a coating on the film. It is obvious that the cost of the article thus produced would be greatly increased.

It is, therefore, a primary object of the invention to provide a cellulosic film or coating which is produced by a simple, efficient, and inexpensive cold process and in a short time, said film or coating having all of the properties above enumerated.

A film produced in accordance with the invention and having the desirable properties herein stated, may have universal use as photographic film, wrapping paper, decorations, etc. A coating of like nature would be particularly useful for weather proofing clothing, and for coating articles such as table cloths, shoe boxes, umbrellas, artificial leather, etc., and also for the preservation of documents and to provide a surface upon which marks in pencil or ink may be made for easy removal or correction. A coating of the indicated nature would be valuable for the preservation of foods and may be employed for coating eggs, fruits and vegetables, flowers, etc.

In contradistinction to the long, drawn-out and complicated processes now employed for obtaining cellulosic articles having the indicated properties, the present invention is simple, quick, and inexpensive, and derives its novelty from the method employed in the combining of ingredients such as set forth in the following non-limitative examples:

Example I

To obtain a transparent, glossy and clear, non-inflammable film or coating, mix:

| | Parts |
|---|---|
| Cellulose acetate in a highly volatile agent | 5 |
| Triacetine | 2 |
| Tributyl phosphate | 1½–2 |

In the above formula, the volatile agent is preferably acetone, chloroform, or ether and together with the cellulose acetate comprises 5 parts of the formula. The entire mixing and film-forming process may be carried out under normal room temperatures which may be as low as 0° C. and as high as 50° C. The cellulose is first dissolved in the volatile agent, and the softener or plasticizer triacetine and the non-inflammable agent tributyl phosphate added. The ingredients are thoroughly agitated to obtain a mixture which is air-free and entirely homogeneous. When a film is desired, the mixture thus provided, is poured or otherwise deposited upon a highly polished surface and filmed out to the desired thickness. When the volatile agents have evaporated, the film is removed and is complete. The product thus obtained will have all of the properties enumerated hereinbefore, and will be non-hygroscopic. When said mixture is to be employed as a coating, it may be poured upon the article to be coated and filmed out thereupon. If, for this purpose, more pliability is desired, somewhat more triacetine may be employed. The mixture may also be used as a lacquer and may be sprayed upon articles to be protected thereby with results comparable to those enumerated.

Example II

In order to indicate the flexibility of the composition disclosed above, the mixture may vary somewhat as shown below:

| | Parts |
|---|---|
| Cellulose acetate in a highly volatile agent | 5 |
| Triacetine | 1½ |
| Tributyl phosphate | 2 |

In either of the above examples, triphenyl camphor may be substituted for the tributyl phosphate.

In the above simple and inexpensive manner, cellulosic film or coating having the properties above stated, may be inexpensively and quickly obtained. Long drawn-out cooking processes and double processing are obviated. The film and coating thus provided will resist the deleterious influences of cleaning compounds, hot and cold water, the corrosive action of fats and polishing creams containing alkaline substances, and will be highly resistant to moisture absorption. This latter property is highly desirable because the product lends itself not only to water-proofing uses but fuses more readily under the application of heat and pressure in the fabrication of bags, pouches, and other articles. When used as a coating, it will enhance the surface upon which it is deposited, will retain the color thereof, or if colored itself, will enhance any surface to a high degree. As a coating, great strength will be imparted to an article provided therewith.

The foregoing examples are to be considered as illustrative only of the invention, it being understood that variations which fall within the spirit of the invention are to be included within the scope thereof as defined in the following claims:

I claim:

1. A composition of matter comprising 5 parts of cellulose acetate and a volatile solvent, 2 parts of triacetine and 1½ to 2 parts tributyl phosphate.

2. A composition of matter comprising 5 parts of cellulose acetate and a volatile solvent, 1½ parts of triacetine and 2 parts of tributyl phosphate.

3. A composition of matter comprising 5 parts of cellulose acetate and a volatile solvent, 1½ to 2 parts of triacetine, and 1½ to 2 parts of tributyl phosphate.

ANTONIE SONNEVELD.